United States Patent

Saeda et al.

[11] Patent Number: 5,910,692
[45] Date of Patent: Jun. 8, 1999

[54] BALL-THREADED SHAFT ANTI-SLIPOUT TYPE LINEAR ACTUATOR

[75] Inventors: Koichi Saeda; Minoru Komada, both of Osaka-fu; Kenichiro Nakamura, Shiga-ken; Toshio Mitsuyama, Osaka-fu, all of Japan

[73] Assignee: Tsubakimoto Chain Co., Osaka-fu, Japan

[21] Appl. No.: 08/985,046

[22] Filed: Dec. 4, 1997

[30] Foreign Application Priority Data

Dec. 6, 1996 [JP] Japan .................................. 8-327021

[51] Int. Cl.$^6$ ............................. H02K 41/00; F16H 25/22
[52] U.S. Cl. ............................. 310/13; 310/23; 74/89.15; 74/424.8
[58] Field of Search ................................. 310/12, 13, 14, 310/23, 89; 361/23, 51; 74/89.15, 425, 606 R, 424.7, 424.8 R; 318/135, 261, 282, 434, 469, 475, 476; 307/119

[56] References Cited

U.S. PATENT DOCUMENTS

| | | | |
|---|---|---|---|
| 4,679,451 | 7/1987 | Nakamura | 74/606 |
| 4,727,762 | 3/1988 | Hayashi | 74/89 |
| 4,763,219 | 8/1988 | Nakamura | 361/23 |
| 4,910,419 | 3/1990 | Hayashi et al. | 310/13 |
| 5,669,264 | 9/1997 | Sakura et al. | 74/89 |

FOREIGN PATENT DOCUMENTS 7332454 12/1995 Japan .

*Primary Examiner*—Nestor Ramirez
*Assistant Examiner*—Judson H. Jones
*Attorney, Agent, or Firm*—Dann, Dorfman, Herrell and Skillman, P.C.; Henry H. Skillman

[57] ABSTRACT

To prevent a ball-threaded shaft from slipping out of a linear actuator, a linear actuator 10 has an output shaft 18 threaded in a nut 16 for moving forward and backward linearly with respect to an outer tube 22 secured to a housing 20. Linear reciprocating movement of the nut 16 is effected by a ball-threaded shaft 14 rotated normally and reversely by a driving motor 12. The shaft is held against axial displacement by a bearing assembly 8 having an axial disk 32 secured to a proximal end 24 of the ball-threaded shaft 14. On the nut side of the disk within the assembly are disposed a first tension receiving rotational body 36, a thrust bearing 45 and a second tension receiving rotational body 58. The assembly 8 is retained by a tension stopper 62 spread and inserted into an annular central groove 60 in the tube 22. The second tension receiving rotational body 58 is formed with a reduced diameter preventing circumferential surface 66 corresponding to an inner peripheral circumferential surface of the C-shaped tension stopper 62. Even if tension and a rotating force are exerted on the tension stopper 62, causing it to be reduced in diameter, the inner peripheral surface thereof comes into contact with the reduced diameter preventing surface 66.

12 Claims, 3 Drawing Sheets

85  81  82  83  84

94  93  91  92  95

BALL-THREADED SHAFT ANTI-SLIPOUT TYPE LINEAR ACTUATOR

FIELD OF THE INVENTION

The present invention relates to a linear actuator in which an output shaft is carried by a nut threadedly engaged with a ball-threaded shaft and is moved forward and backward with respect to a housing by rotation of the ball-threaded shaft. More specifically, the present invention relates to a linear actuator which, when an axial external force is applied to an output shaft, prevents rotation of the ball-threaded shaft, and prevents of the ball-threaded shaft from slipping out of the actuator housing.

BACKGROUND OF THE INVENTION

A conventional linear actuator is shown in FIGS. 4 and 5 of Japanese Patent Application Laid-Open No. 7-332454 Publication. In the linear actuator of this kind, when a driving force and a braking force of its motor disappears, and a tension or a pressing force is exerted on an output shaft (not shown), the tension or the pressing force generates a rotating force in the ball-threaded shaft which has a thrust bearing assembly mounting the shaft in a housing.

Any axial tension exerted on the ball-threaded shaft tends to displace the bearing assembly, and such displacement is prevented by a tension stopper spread and inserted into a central annular groove in the inner periphery of the housing. The assembly includes an axial disk, a first thrust bearing, a first tension receiving rotational body and a second tension receiving rotational body. When the tension exerts a force on the tension stopper, the second tension receiving rotational body is restrained in rotation by the frictional force with respect to the tension stopper, and the first tension receiving rotational is likewise restrained in rotation by the frictional force with respect to the second tension receiving rotational body. Further, a coil spring is frictionally engaged between the axial disk and the first body whereby the axial disk is restrained in rotation with respect to the first tension receiving rotational body. Accordingly, the ball-threaded shaft is prevented from being rotated.

On the other hand, any axial pressing force exerted on the ball-threaded shaft tends to displace the bearing assembly against a pressing force stopper secured to the end of the housing. The displacement is prevented by the axial disk, a second thrust bearing, and a pressing force receiving rotational body. The ball-threaded shaft is prevented from being rotated when under a pressing force similar to the aforementioned restraint when under tension.

However, in the conventional linear actuator, when the driving force or the braking force of the motor is interrupted, a rotating force is exerted on the ball-threaded shaft. This rotating force is transferred to the tension stopper through the axial disk, the coil spring, the first tension receiving rotational body and the second tension receiving rotational body. Since a frictional force exists between the tension receiving rotational body and the tension stopper, the C-shaped tension stopper tends to rotate and become reduced in diameter by the rotating force. Since the ball-threaded shaft is in under tension, when the reduced-diameter C-shaped tension stopper moves out of the central annular groove of the housing, the bearing assembly may slip out of the housing past the central groove. Accordingly, in the case where the output shaft suspends a heavy article, there poses a problem in that the heavy article drops, resulting in a very dangerous state.

SUMMARY OF THE INVENTION

It is therefore an object of the present invention to provide a linear actuator in which even if a driving force or a braking force of a motor is interrupted when tension is exerted on the ball-threaded shaft, the ball-threaded shaft is prevented from slipping out of the housing.

The present invention has solved the aforesaid problem by the provision of an improved bearing assembly for a ball-threaded shaft of a linear actuator in which an output shaft mounted on a nut is linearly moved forward and backward with respect to a housing by linear reciprocating movement of the nut on a ball-threaded shaft normally and reversely rotated by a driving motor, the bearing assembly comprising:

an axial disk fixedly mounted on a proximal end of said ball-threaded shaft, a first tension receiving rotational body loosely fitted in the axis of said proximal end adjacent to the nut side of said axial disk, a thrust bearing interposed between the opposed surfaces of said axial disk and said first tension receiving rotational body, and a coil spring frictionally engaged to the outer peripheries of said axial disk and said first tension receiving rotational body. The actuator includes a C-shaped tension stopper spread and inserted into a central annular groove formed in the inner periphery of said housing on the nut side of said first tension receiving rotational body. The stopper has a rectangular cross section with an axial surface confronting a second tension receiving rotational body disposed between said first tension receiving rotational body and said tension stopper to transmit tension to said tension stopper from said axial disk, said thrust bearing and said first tension receiving rotational body. Said second tension receiving rotational body is formed with a reduced diameter shoulder providing an annular recess with a tension exerting axial surface opposed to the tension receiving axial surface of said tension stopper, and a tension-stopper reduced-diameter-confronting circumferential surface opposed to the inner peripheral circumferential surface of said tension stopper with a slight clearance.

The present invention further has solved the aforesaid problem by the provision of a ball-threaded shaft anti-slipout bearing assembly in a linear actuator in which an output shaft mounted on a nut is linearly moved forward and backward with respect to a housing by linear reciprocating movement of the nut on a ball-threaded shaft normally and reversely rotated by a driving motor, the bearing assembly comprising:

an axial disk fixedly mounted on a proximal end of said ball-threaded shaft, a tension receiving rotational body loosely fitted on the axis of said proximal end adjacent to the nut side of said axial disk, a pressing force receiving rotational body on the opposite side of said axial disk, a thrust bearing interposed between the confronting surfaces of said axial disk and said pressing force receiving rotational body, and a coil spring frictionally engaged with the outer peripheries of said axial disk, and said pressing force receiving rotational body. The actuator includes a C-shaped tension stopper spread and inserted into an annular central groove formed in the inner periphery of said housing on the nut side of said tension receiving rotational body, the stopper having a rectangular cross section having an axial surface confronting said tension receiving body, a pressing force stopper secured to said housing on the extreme end side of the proximal end of said pressing force receiving rotational body, said latter stopper limiting displacement of said body by a pressing force exerted on said ball-threaded shaft, said tension receiving rotational body being formed with a reduced diameter preventing shoulder forming an annular recess having a tension exerting axial surface confronting the tension receiving axial surface of said tension stopper, and a circumferential surface opposed to the inner peripheral circumferential surface of said tension stopper with a slight clearance.

When a driving force or a braking force from the motor is interrupted in the state in which tension is exerted on the output shaft, a rotating force as well as a tension are generated in the ball-threaded shaft. The tension is exerted on the C-shaped tension stopper through the tension receiving axial surface of the C-shaped tension stopper from the tension exerting axial surface of a tension receiving rotational body by the axial disk. On the other hand, the rotating force is exerted on the C-shaped tension stopper through the tension receiving axial surface of the C-shaped tension stopper and the confronting axial surface of tension receiving rotational body by the axial disk.

However, since the tension receiving rotational body adjacent to the C-shaped tension stopper is formed with the tension stopper reduced diameter preventing circumferential surface opposed to the inner peripheral circumferential surface of the tension stopper, the rotating force exerted on the tension stopper which tends to reduce the diameter of the C-shaped tension stopper, causes the tension stopper reduced diameter preventing circumferential surface of the tension receiving rotational body to come in contact with the inner peripheral surface of the tension stopper to prevent the reduction in diameter. Accordingly, even if the rotating force caused by the tension should be exerted on the C-shaped tension stopper, the tension stopper is not moved out of the annular groove of the housing, and even in the state in which the driving force or the braking force is interrupted, the ball-threaded shaft can be positively held within the housing.

BRIEF DESCRIPTION OF THE DRAWINGS

All of the objects of the present invention are more fully set forth hereinafter with reference to the accompanying drawings, wherein.

DETAILED DESCRIPTION OF THE PREFERRED EMBODIMENTS

Figure 1:
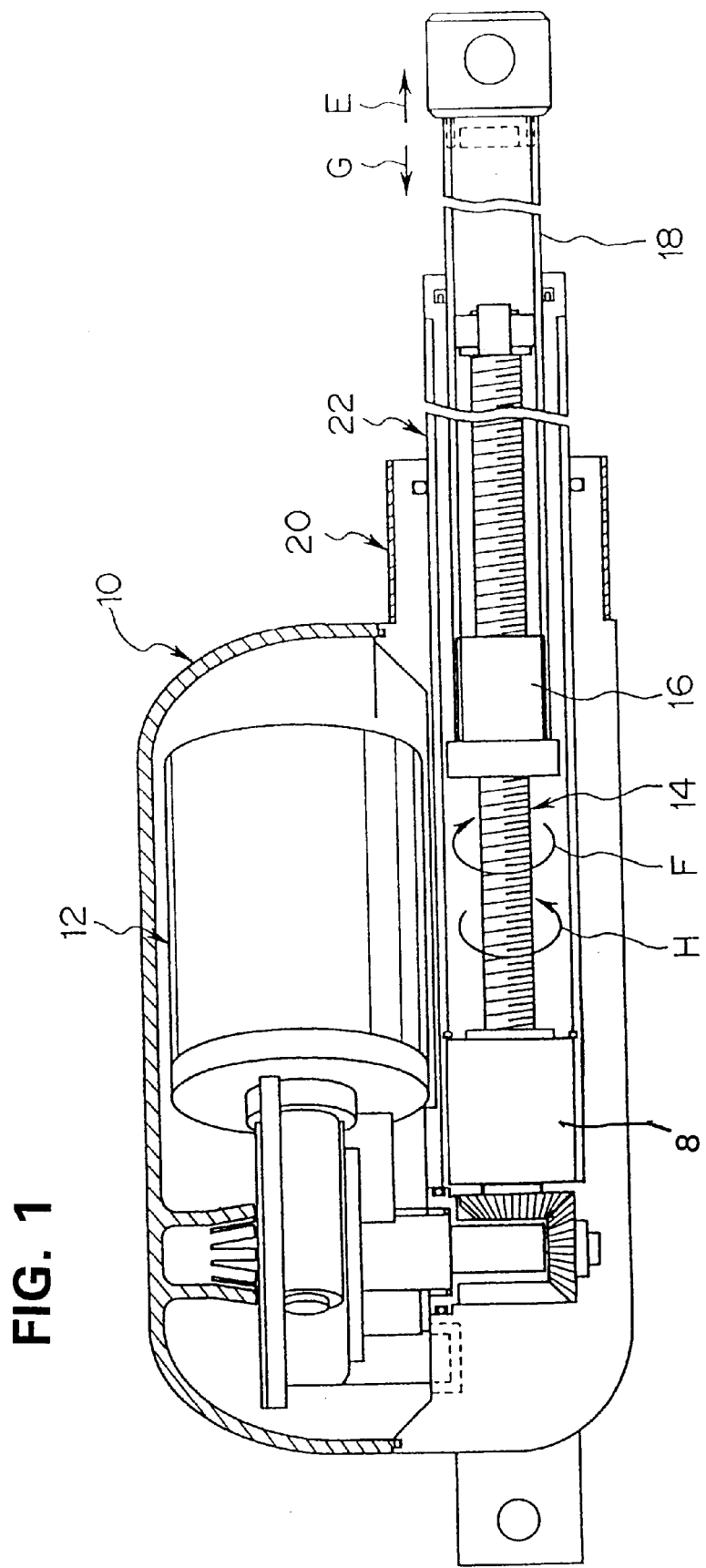
FIG. 1 shows an embodiment of the present invention and is a schematic front view of the entire linear actuator partially in section along the ball-threaded shaft.

FIG. 1 shows the entire linear working machine according to the present invention. A linear actuator 10 is constituted such that a hollow output shaft 18 is mounted on a nut 16 so that the output shaft 18 is moved forward and backward linearly with respect to an outer tube 22 secured to a housing 20 by linear reciprocating movement of the nut 16 on a ball-threaded shaft 14 which is held against axial movement by a bearing assembly 8 and is rotated normally and reversely by a driving motor 12. The motor 12 produces a driving force or a braking force, and when the force is interrupted under the condition that an axial load is exerted on the output shaft, a rotating force in addition to a tensile force or a pressing force is exerted on the ball-threaded shaft 14. If a tensile force (indicated by the arrow E) is exerted on the output shaft 18, a rotating force in a direction of the arrow F is generated in the ball-threaded shaft 14, and if the pressing force (indicated by the arrow G) is exerted on the output shaft 18, a rotating force in a direction of the arrow H is generated in the ball-threaded shaft 14.

Figure 2:
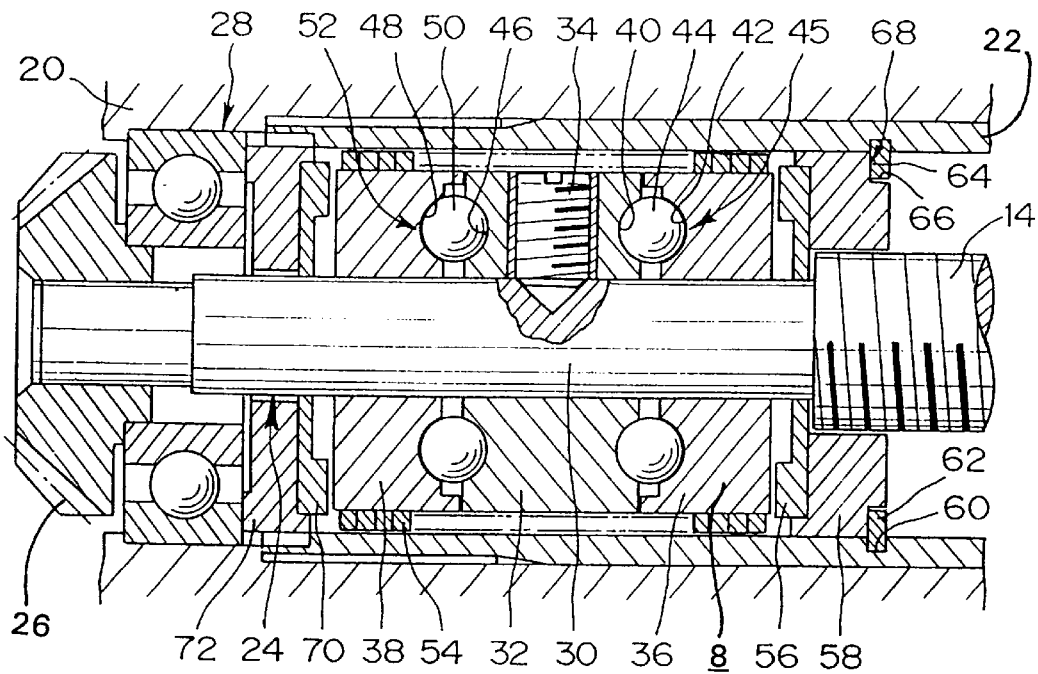
FIG. 2 is a sectional view of the bearing assembly of the linear actuator shown in FIG. 1.

As shown in detail in FIG. 2, a bevel gear 26 (into which the driving force or a braking force of the motor 12 is input) is secured to an extreme end of a proximal end 24 of the ball-threaded shaft 14. A ball bearing 28 secured to a housing 20 rotatably supports the bevel gear 26 and the ball-threaded shaft 14. With this, the ball-threaded shaft 14 is normally and reversely rotated by the motor 12 to move the nut 16 and the output shaft 18 in an axial direction.

The shaft 18 is mounted in the proximal end of the tube 22 by the bearing assembly 8. An axial disk 32 is secured by means of a stop screw 34 to a small diameter portion 30 in the proximal end 24 of the ball-threaded shaft 14. On the ball and nut side of the axial disk 32, a first tension receiving rotational body 36 is loosely fitted in the small diameter portion 30 adjacent thereto. On the other hand, on the side opposite to the first tension receiving rotational body 36 of the axial disk 32, a pressing force receiving rotational body 38 having the same shape as that of the first tension receiving rotational body 36 is loosely fitted in the small diameter portion 30 adjacent thereto.

The opposed surfaces of the axial disk 32 and the first tension receiving rotational body 36 are formed with annular rolling grooves 40, 42 concentric with the small diameter portion 30, and a plurality of balls 44 are evenly spaced within these rolling grooves 40, 42 by means of a retainer to constitute a thrust bearing 45. The opposed surfaces of the axial disk 32 and the pressing force receiving rotational body 38 are formed with annular rolling grooves 46, 48 concentric with the small diameter portion 30, and a plurality of balls 50 are evenly spaced within these rolling grooves 46, 48 by means of a retainer to constitute a thrust bearing 52. Since the rolling grooves for the balls 44, 50 are directly formed in the axial disk 32, the first tension receiving rotational body 36 and the pressing force receiving rotational body 38, the number of parts can be lessened, and the steps of assembly can be reduced. While the rolling grooves in FIG. 2 are illustrated substantially semicircular in cross section, it is to be noted that the rolling grooves may have a V-shaped cross section.

The axial disk 32, the first tension receiving rotational body 36 and the pressing force receiving rotational body 38 are equal in outside diameter and are embraced by a coil spring 54. The coil spring 54 is formed by closely winding a wire material having a rectangular cross section in a coil-like form, and the inside diameter of the coil spring 54 is set to be smaller than the outside diameter of the axial disk 32, the first tension receiving rotational body 36 and the pressing force receiving rotational body 38. Therefore, the coil spring 54 is forcibly spread in inside diameter and frictionally engaged with the axial disk 32, the first tension receiving rotational body 36 and the pressing force receiving rotational body 38.

If a relative rotation between the disk 32 and the bodies 36 and 38 occurs in a direction in which the inside diameter of the coil spring 54 tends to become smaller between the axial disk 32 and the first tension receiving rotational body 36 or between the axial disk 32 and the pressing force receiving rotational body 38, the coil spring 54 becomes more securely engaged with these components. Accordingly, relative rotation between the axial disk 32 and the first tension receiving rotational body 36 or the relative rotation between the axial disk 32 and the pressing force receiving rotational body 38 is restricted. As a result, in the state in which the first tension receiving rotational body 36 is prevented from being rotated, the axial disk 32 and the ball-threaded shaft 14 are also prevented from being rotated. On the other hand, in the state in which the pressing force receiving rotational body 38 is prevented from being rotated, the axial disk 32 and the ball-threaded shaft 14 are also prevented from being rotated.

If relative rotation occurs in the opposite direction, tending to increase the inside diameter of the coil spring 54, the frictional engagement of the spring with the components of the bearing assembly 8 is lessened, reducing the resistance to relative rotation between the components.

Figure 5:
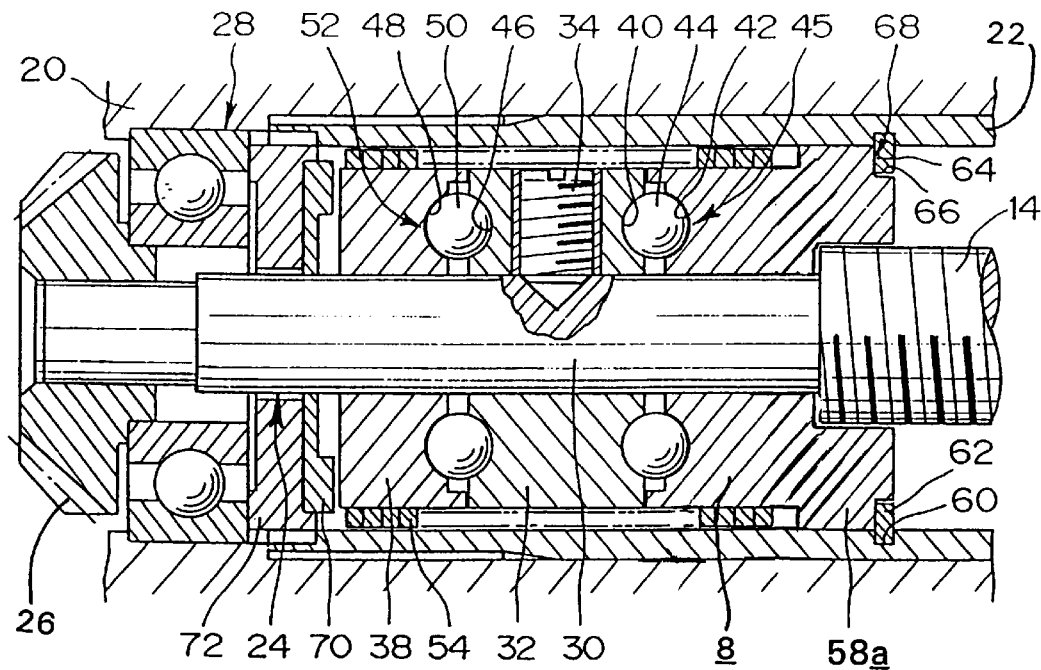
FIG. 5 is a sectional view similar to FIG. 2 showing a bearing assembly with integrated components.

On the nut side of the first tension receiving rotational body 36, a second tension receiving rotational body 58 is loosely fitted in an inner peripheral surface of the outer tube 22 and an axial surface engages the free axial end of the body 36 through a washer 56 made of resin. It is noted that the first tension receiving rotational body 36 and the second tension receiving rotational body 58 may be integrally formed as indicated at 58*a* in FIG. 5, eliminating the resin washer 56.

On the nut side of the second tension receiving rotational body 58, an annular groove 60 having a rectangular cross section is formed in the inner peripheral surface of the outer tube 22 in the center of the housing 20. A tension stopper 62 which has a C-shape as a whole and having a rectangular cross section is spread and inserted snugly into the annular groove 60. The radial width of the rectangular cross section of the stopper 62 is greater than the radial depth of the groove 60, so that a tension receiving axial surface of the tension stopper 62 projects internally in a diametric direction from the inner peripheral surface of the outer tube 22. At the inner end of the axial surface of the cross section, a circumferential surface defines the inner peripheral surface of the tension stopper 62.

The second tension receiving rotational body 58 is provided with an annular reduced-diameter-preventing shoulder 68 formed with a tension-acting axial surface 64 opposed to the tension-receiving surface of the tension stopper 62 and a tension-stopper-reduced-diameter-preventing circumferential surface 66 opposed to the inner peripheral surface of the tension stopper 62 with a slight radial clearance. Since the tension stopper has a C shape, it tends to be reduced in diameter when it receives both a tension and a rotating force from the second tension receiving rotational body 58. However, the slight clearance is made less than the radial depth of the groove 60, so that when the C-shaped tension stopper 62 has been reduced in diameter through the slight clearance, the inner peripheral surface thereof comes in contact with the reduced diameter preventing surface 66 of the reduced diameter preventing shoulder 68 of the second tension receiving rotational body 58 to prevent further reduction in diameter.

While in the present embodiment, the reduced diameter preventing surface 66 is formed as an annular peripheral surface of the shoulder 68, it is to be noted that the reduced diameter preventing surface may be formed separately as a ring projecting from the circular surface in a direction to prevent the tension stopper 62 from being reduced in diameter.

Needless to say, it is necessary to make the slight clearance smaller than the depth of the annular groove 60 in order to prevent the C-shaped tension stopper 62 from being slipped out of the annular groove 60. It is however preferred that the slight clearance is made as small as possible in order that the tension stopper 62 is firmly retained in the groove 60 against the tension of the output shaft 18. Preferably, the width of the groove 60 along the axis of the housing corresponds to the thickness of the stopper 62, so that the stopper is snugly received in the groove and is not readily twisted about its circumference.

When a driving force or a braking force of the motor 12 is interrupted when tension is exerted on the output shaft 18, both tension and rotating forces are exerted on the ball-threaded shaft 14. The tension is exerted on the tension stopper 62 through the axial disk 32 secured to the proximal portion 24, the thrust bearing 45, the first tension receiving rotational body 36, the resin washer 56 and the second tension receiving rotational body 58. The first tension receiving rotational body 36, the resin washer 56 and the second tension receiving rotational body 58 assume the state in which the former is restrained in rotation with respect to the tension stopper 62 by the frictional force. The ball-threaded shaft 14 and the axial disk 32 tend to rotate, but since the coil spring 54 firmly engages both the disk 32 and the body 36, the axial disk is restrained in rotation with respect to the first tension receiving rotational body. The rotating force is also transmitted to the tension stopper 62, but since the tension stopper 62 is prevented from being reduced in diameter as explained previously, the ball-threaded shaft 14 is positively held within the housing 20 by the bearing assembly 8, and a load member connected to the output shaft 18 maintains its stop position.

On the side opposite the ball and nut of the pressing force receiving rotational body 38, a pressing force stopper 72 is provided through a washer made of resin 70. The pressing force stopper 72 is threadedly engaged with the outer tube 22, and is mounted in contact with an outer race ring of the ball bearing 28.

When a driving force or a braking force of the motor 12 is interrupted when a pressing force is exerted on the output shaft 18, both a pressing force and a rotating force are exerted on the ball-threaded shaft 14. The pressing force is exerted on the pressing force stopper 72 through the axial disk 32 secured to the proximal portion 24, the thrust bearing 52, the pressing force receiving rotational body 38, and the resin washer 70. The pressing force receiving rotational body 38 and the resin washer 70 assume the state in which the former is restrained from rotation with respect to the pressing force stopper 72 by the frictional force. The ball-threaded shaft 14 and the axial disk 32 tend to rotate, but since the coil spring 54 is frictionally engaged with the body 36 and the disk 32, the axial disk 32 is restrained from rotation with respect to the pressing force receiving rotational body 36. As described above, the ball-threaded shaft 14 assumes the state in which the former is restrained from axial movement and rotation.

Figure 3:
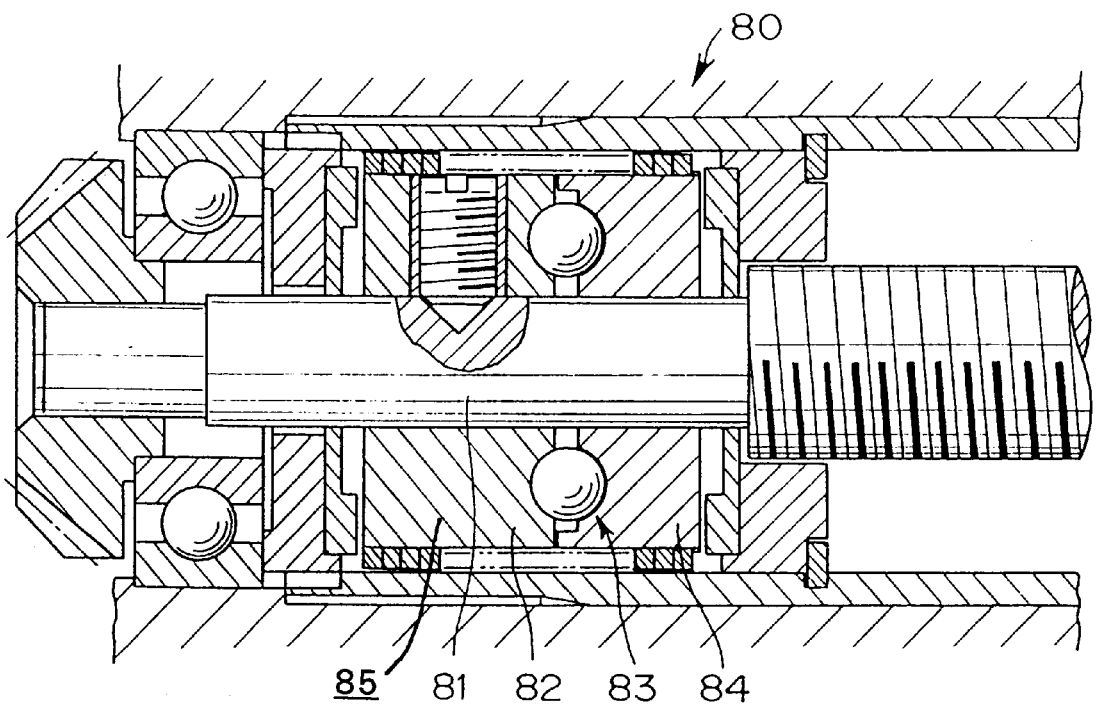
FIG. 3 is a sectional view similar to FIG. 2 showing the bearing assembly of a linear actuator which is mainly designed to accommodate tension on the shaft.
Figure 4:
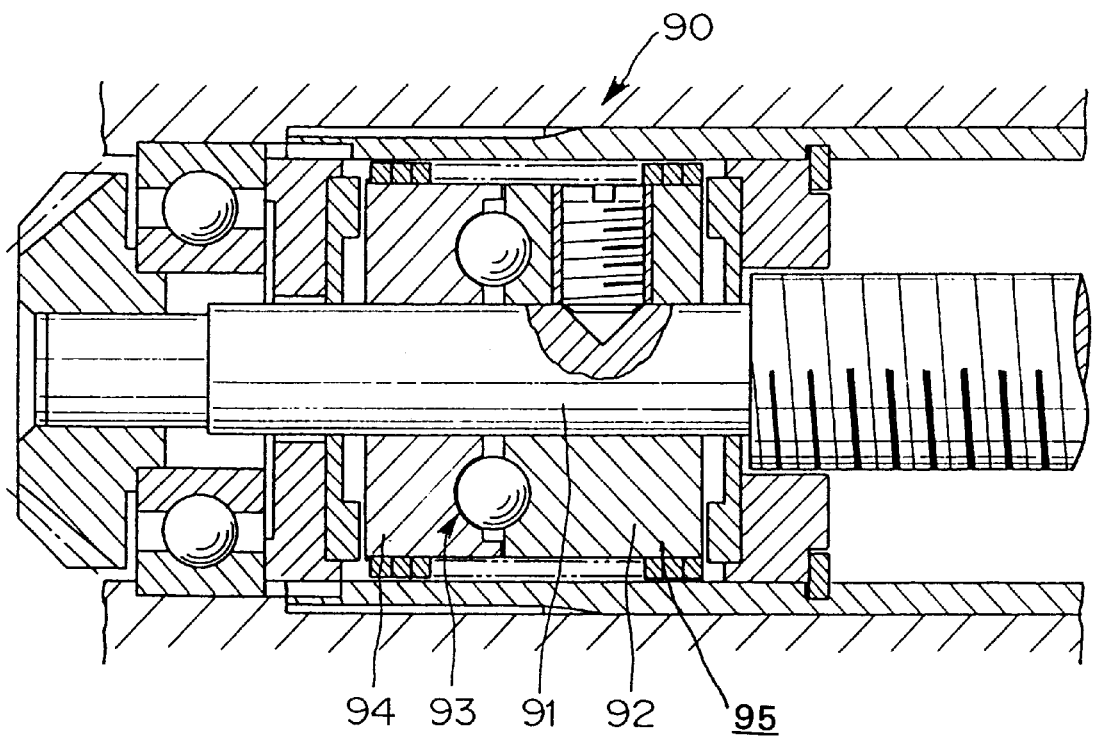
FIG. 4 is a sectional view similar to FIG. 2 showing the bearing assembly of a linear actuator which is designed to accommodate pressing force on the shaft.

FIG. 3 shows a tension exclusive-use linear actuator, and FIG. 4 shows a pressing force exclusive-use linear actuator. While the present invention is applied to the linear actuator on which mainly tension is exerted, the present invention may be applied to the linear actuator on which mainly pressing force is exerted in order to positively prevent the ball-threaded shaft from slipping out of the housing.

The linear actuators shown in FIGS. 3 and 4 are assembled with parts used in common and with some parts changed in direction whereby they can be freely interchanged between a linear actuator on which mainly tension is exerted and a linear actuator on which mainly pressing force is exerted.

In the following paragraphs, the structure of the bearing assemblies which is different from the linear actuator shown in FIG. 2 will be explained.

In a linear actuator 80 on which mainly tension is exerted, as shown in FIG. 3, a bearing assembly 85 has an axial disk 82 secured to a small diameter portion 81 of the ball-threaded shaft of the actuator 80 by means of a stop screw. A thrust bearing 83 and a first tension receiving rotational body 84 are disposed only on the nut side of the axial disk 82 in the assembly 85. On the side of the axial disk 82 opposite to the nut, there is no need for a rolling groove and a thrust bearing and a pressing force receiving rotational body are not provided.

In a linear actuator 90 on which mainly tension is exerted, as shown in FIG. 4, a bearing assembly 95 an axial disk 92 secured to a small diameter portion 91 of the ball-threaded shaft of the actuator 90 by means of a stop screw. A thrust bearing 93 and a pressing force receiving rotational body 94 are disposed only on the side of the axial disk 92 opposite to the nut. On the side of the axial disk 92 confronting of the nut, a rolling groove is not needed and a thrust bearing and a first tension receiving rotational body are not provided.

The axial disks 82, 92 are identical. Further, the first tension receiving rotational body 84 and the pressing force receiving rotational body 94 are also identical. Other components of the actuator are substantially the same as in the linear actuator shown in FIG. 2 except that the ball-threaded shaft, the housing and the outer tube are different in length. Accordingly, when the linear actuator is assembled, the direction of the axial disk is changed and the first tension receiving rotational body or the pressing force receiving rotational body are changed in position of installation, merely by which it is possible to freely select whether the structure of the linear actuator is assembled for a use in which mainly tension is exerted or for a use in which mainly pressing force is exerted. With this structure, parts of the bearing assemblies arranged on the small diameter portions 81, 91 are reduced in number, and the axial length of the entire linear actuator is shortened, which is useful for the case where there is a space limitation around the linear actuator.

As described above, according to the present invention, when the driving force or the braking force is interrupted when tension is exerted on the output shaft, both a rotating force and a tension are exerted on the tension stopper. In the linear actuator according to the present invention, a reduced diameter preventing circumferential surface is formed on the tension receiving rotational body, the reduced diameter preventing circumferential surface being opposed with a slight clearance to the inner peripheral circumferential surface of the C-shaped tension stopper. Accordingly, even if the tension and the rotating forces are exerted on the tension stopper so that the C-shaped tension stopper tends to be reduced in diameter, the reduced diameter preventing circumferential surface prevents it. Therefore, the tension stopper is positively held within the annular groove, and even if the driving force or the braking force of the motor is interrupted, the ball-threaded shaft does not slip out of the housing, and the present invention makes the actuator very safe.

While particular embodiments of the invention have been herein illustrated and described, it is not intended to limit the invention to such disclosures, but changes and modifications may be made therein and thereto within the scope of the following claims.

We claim:

1. A linear actuator having a housing and an output shaft mounting a nut, a ball-threaded shaft adapted for moving said nut forward and backward with respect to the housing by linear reciprocating movement of the nut on said ball-threaded shaft, and a driving motor normally and reversely rotating said ball-threaded shaft, said actuator comprising:

an axial disk fixedly mounted on a proximal end of said ball threaded shaft;

a first tension receiving rotational body loosely fitted in said housing at said proximal end adjacent to the nut between said axial disk and said nut;

thrust bearing components interposed between the opposed surfaces of said axial disk and said first tension receiving rotational body;

a coil spring frictionally engaging the outer periphery of said axial disk and said first tension receiving rotational body;

an internal annular groove in said housing surrounding said ball-threaded shaft between said first tension receiving body and said nut;

a C-shaped tension stopper spread and inserted into said internal annular groove of said housing and having a rectangular cross section, said cross section having a tension-receiving surface preventing axial displacement of said first body in a direction of tension exerted on said ball threaded shaft and an inner peripheral circumferential surface; and a second tension receiving rotational body disposed between said first tension receiving rotational body and said tension stopper to transmit tension to said tension stopper from said axial disk, said thrust bearing components and said first tension receiving rotational body, characterized in that said second tension receiving rotational body is formed with a reduced diameter preventing shoulder forming an annular recess with a tension exerting axial surface confronting said tension receiving surface of said tension stopper and a tension stopper reduced diameter preventing circumferential surface opposed to said inner peripheral circumferential surface of said tension stopper with a slight clearance.

2. The linear actuator according to claim 1 wherein said first tension receiving rotational body and said second tension receiving rotational body are integrated.

3. The linear actuator according to claim 1 including a resin washer positioned between said first tension-receiving body and said second tension-receiving body.

4. A linear actuator having a housing, a driving motor, an output shaft, a nut carried by said output shaft and adapted to be linearly moved forward and backward with respect to the housing, a ball-threaded shaft engaging said nut, normally and reversely rotated by said driving motor, comprising:

an axial disk fixedly mounted on a proximal end of said ball threaded shaft;

a first tension receiving rotational body loosely fitted in said housing at said proximal end adjacent to the nut between said axial disk and said nut;

first thrust bearing components interposed between the opposed surfaces of said axial disk and said first tension receiving rotational body;

a coil spring frictionally engaging the outer periphery of said axial disk, said first tension receiving rotational body;

an internal annular groove in said housing surrounding said ball-threaded shaft between said first tension receiving body and said nut;

a C-shaped tension stopper spread and inserted into said annular groove and having a rectangular cross section, said cross section having a tension-receiving surface preventing axial displacement of said first body in a direction of tension exerted on said ball threaded shaft and an inner peripheral circumferential surface;

a pressing force receiving body loosely fitted in said housing between the axial disk and the extreme end of the proximal end and having an outer periphery frictionally engaged with said coil spring;

second thrust bearing components interposed between the opposed surfaces of said axial disk and said pressing force receiving body;

a pressing force stopper secured to said housing on the extreme end side of the proximal end of said pressing force receiving rotational body and preventing axial displacement of said body in the direction of pressing force exerting on said ball-threaded shaft; and a second tension receiving rotational body disposed between said first tension receiving rotational body and said tension stopper to transmit tension to said tension stopper from said axial disk, said first thrust bearing components and said first tension receiving rotational body, characterized in that said second tension receiving rotational body is formed with a reduced diameter preventing shoulder forming an annular recess with a tension exerting axial surface confronting said tension receiving surface of said tension stopper and a tension stopper reduced diameter preventing circumferential surface opposed to said inner peripheral surface of said tension stopper with a slight clearance.

5. The linear actuator according to claim 4, wherein said first tension receiving rotational body and said second tension receiving rotational body are integrated.

6. The linear actuator according to claim 4 including a resin washer positioned between said first tension-receiving body and said second tension-receiving body.

7. A linear actuator having an elongated housing with an inner periphery having an annular groove centrally therein;

a ball threaded shaft mounted for rotation within said inner periphery and adapted to be normally and reversely rotated by a driving motor;

a bearing assembly mounting said ball-threaded shaft against axial displacement in said elongated housing;

a C-shaped tension stopper spread and inserted into said annular groove and having a rectangular cross section, said cross section providing an axial surface projecting inwardly from said groove into said elongated housing and a circumferential surface on its inner periphery;

a pressing force stopper in said housing spaced from said tension stopper, said bearing assembly being mounted between said stoppers;

an output shaft coaxial with said ball-threaded shaft in said housing and having a nut threadedly engaging said ball-threaded shaft and operable to be linearly moved forward and backward with respect to said housing by said normal and reverse rotation of the ball-threaded shaft, said output shaft being subject to tension tending to move said output shaft forwardly and a pressing force tending to move said output shaft rearwardly;

said bearing assembly comprising:

an axial disk fixedly mounted on a proximal end of said ball threaded shaft with one axial surface facing forwardly toward said nut and opposite axial surface facing backwardly;

at least one rotational body loosely fitted on said proximal end and having an axial surface confronting one of said axial surfaces of the disk, thrust bearing components interposed between the confronting surfaces of said axial disk and said at least one rotational body, a coil spring frictionally engaging the outer peripheries of said axial disk and said at least one rotational body, said bearing assembly having an end positioned to transmit tension to said C-shaped tension stopper from said axial disk, said bearing assembly end having a shoulder comprising a tension-exerting axial surface opposed to said inwardly projecting axial surface of said tension stopper and a circumferential surface opposed to the inner peripheral circumferential surface of said tension stopper with a slight clearance, whereby upon application of tension to said output shaft, the axial surface of said shoulder engages the axial surface of said stopper and limits axial displacement of said bearing assembly, and the circumferential surface of said shoulder engages the circumferential surface of said stopper to preclude disengagement of said stopper from said annular groove.

8. A linear actuator according to claim 7, wherein said at least one rotational body comprises:

a first tension receiving rotational body loosely fitted on said proximal end adjacent to said one axial surface of said axial disk, said bearing assembly including a second tension receiving rotational body disposed between said first tension receiving rotational body and said tension stopper to transmit tension to said tension stopper from said axial disk, said shoulder being formed on said second tension receiving rotational body.

9. The linear actuator according to claim 8 wherein said first tension receiving rotational body and said second tension receiving rotational body are integrated.

10. The linear actuator according to claim 8 including a washer positioned between said first tension-receiving rotation and said second tension-receiving rotational body.

11. The linear actuator according to claim 7 wherein said axial surface of the C-shaped tension stopper has a given radial depth greater than the groove radial depth whereby the difference between said radial depth provides said inwardly projecting axial surface of said tension stopper, said slight clearance between said circumferential surfaces being less than the groove radial depth.

12. The linear actuator according to claim 11 wherein the width of the groove along the axis of the housing snugly receives the thickness of said stopper, the width of the circumferential surface of the shoulder being preferably greater than the thickness of the stopper so as to reduce the likelihood of the stopper slipping past the shoulder as it is reduced in diameter by the combined tension and rotational force.

* * * * *